United States Patent
Zhang

(10) Patent No.: US 10,900,882 B2
(45) Date of Patent: Jan. 26, 2021

(54) ELECTROSTATIC SOOT SENSOR

(71) Applicant: Continental Automotive GmbH, Hannover (DE)

(72) Inventor: Hong Zhang, Tegernheim (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 452 days.

(21) Appl. No.: 16/062,798

(22) PCT Filed: Dec. 7, 2016

(86) PCT No.: PCT/EP2016/080094
§ 371 (c)(1),
(2) Date: Jun. 15, 2018

(87) PCT Pub. No.: WO2017/102505
PCT Pub. Date: Jun. 22, 2017

(65) Prior Publication Data
US 2020/0284711 A1    Sep. 10, 2020

(51) Int. Cl.
*G01N 15/06* (2006.01)

(52) U.S. Cl.
CPC ................ *G01N 15/0656* (2013.01)

(58) Field of Classification Search
CPC .. G01N 1/00; G01N 2201/00; G01N 15/0656; G01N 33/0027; F02D 41/1466; G01R 19/0092; G01M 15/102
See application file for complete search history.

(56) References Cited

U.S. PATENT DOCUMENTS 5,006,134 A * 4/1991 Knoll ................ B03C 3/70
96/88
5,662,786 A * 9/1997 Friese ................ G01N 27/4075
204/427

(Continued)

FOREIGN PATENT DOCUMENTS

DE    19536705 A1    4/1997    ............ F01N 3/01
DE    102007046096 A1    4/2009    ............ G01N 15/06

(Continued)

OTHER PUBLICATIONS

German Office Action, Application No. 102015225745.2, 6 pages, dated Nov. 15, 2016.

(Continued)

*Primary Examiner* — Francis C Gray
(74) *Attorney, Agent, or Firm* — Slayden Grubert Beard PLLC

(57) ABSTRACT

Example electrostatic soot sensors may include: a voltage supply; a first electrode; a second electrode; a guard electrode; and an insulating body isolating the first electrode and the second electrode from one another. The guard electrode may be arranged between the first and the second electrode and electrically insulated from them by the insulating body. A first electrical potential is applied to the first electrode and a second to the second electrode, with a resulting electrical voltage between the first and the second electrode. A guard potential is applied to the guard electrode. The guard potential corresponds to a first guard potential in the warm-up phase of the soot sensor and to a second guard potential in the measuring phase of the soot sensor.

9 Claims, 4 Drawing Sheets

(56) References Cited

U.S. PATENT DOCUMENTS

| | | | | |
|---|---|---|---|---|
| 5,950,424 | A  * | 9/1999 | Nojima | F01N 3/01 |
| | | | | 60/275 |
| 6,772,584 | B2 * | 8/2004 | Chun | F01N 13/009 |
| | | | | 60/275 |
| 6,783,575 | B2 * | 8/2004 | Pasic | B03C 3/16 |
| | | | | 96/44 |
| 8,640,526 | B2 | 2/2014 | Di Miro et al. | 73/28.01 |
| 2009/0090622 | A1 | 4/2009 | Ripley | 204/401 |
| 2010/0005880 | A1 | 1/2010 | Dieterle et al. | 73/304 R |
| 2012/0262182 | A1 * | 10/2012 | Matsuoka | G01N 15/0656 |
| | | | | 324/464 |
| 2012/0285219 | A1 * | 11/2012 | Matuoka | F02D 41/1466 |
| | | | | 73/23.33 |
| 2013/0298640 | A1 | 11/2013 | Ante et al. | 73/28.01 |

FOREIGN PATENT DOCUMENTS

| | | | | |
|---|---|---|---|---|
| DE | 102007046099 A1 | 4/2009 | | G01N 15/06 |
| DE | 102010030634 A1 | 12/2011 | | G01N 27/04 |
| DE | 102010055478 A1 | 6/2012 | | G01N 27/04 |
| EP | 2511690 A2 | 10/2012 | | G01N 15/06 |
| WO | 2017/102505 A1 | 6/2017 | | G01N 15/06 |

OTHER PUBLICATIONS

International Search Report and Written Opinion, Application No. PCT/EP2016/080094, 14 pages, dated Feb. 22, 2017.

* cited by examiner

ELECTROSTATIC SOOT SENSOR

CROSS-REFERENCE TO RELATED APPLICATIONS

This application is a U.S. National Stage Application of International Application No. PCT/EP2016/080094 filed Dec. 7, 2016, which designates the United States of America, and claims priority to DE Application No. 10 2015 225 745.2 filed Dec. 17, 2015, the contents of which are hereby incorporated by reference in their entirety.

TECHNICAL FIELD

The present disclosure relates to soot sensors. Various embodiments of the teachings herein may include electrostatic soot sensors.

BACKGROUND

The reduction of exhaust gas emissions is an important objective when developing new motor vehicles. Therefore, combustion processes in internal combustion engines are optimized thermodynamically so that the efficiency of the internal combustion engine is significantly improved. Diesel engines are being increasingly used which, in a modern design, have very high efficiency.

One disadvantage of diesel engines compared to optimized spark ignition engines is, however, a significantly increased emission of soot. Soot may have a highly carcinogenic effect as result of the accumulation of polycyclic aromatics, which has already prompted various regulations. For example, exhaust gas emission standards with maximum limits for the emission of soot have been issued. To satisfy the exhaust gas emission standards over several countries/ authorities for motor vehicles with diesel engines, there is a need for cost-effective sensors which reliably measure the soot content in the exhaust gas stream of the motor vehicle.

Soot sensors measure the instantaneous emitted soot so that the engine management system in a motor vehicle can reduce the emission values through technical control adjustments. Moreover, the soot sensors can be used to initiate active exhaust gas purification by means of exhaust gas soot filters or exhaust gas recirculation to the internal combustion engine. In the case of soot filtering, filters which can be regenerated and which filter out a significant part of the soot content from the exhaust gas are used. Soot sensors are required to monitor the function of the soot filters or to control their regeneration cycles. For this purpose, a soot sensor can be connected upstream and/or a soot sensor can be connected downstream of the soot filter, which is also referred to as a diesel particle filter.

A sensor which is connected upstream of the diesel particle filter serves to increase the system reliability and to ensure operation of the diesel particle filter under optimum conditions. Since this depends to a large degree on the quantity of soot which is trapped in the diesel particle filter, precise measurement of the particle concentration upstream of the diesel particle filter system, in particular the determination of a high particle concentration upstream of the diesel particle filter, is highly significant. A soot sensor which is connected downstream of the diesel particle filter provides the possibility of performing vehicle-specific diagnostics and also serves to ensure the correct operation of the exhaust gas after-treatment system.

The state of the art presents various approaches to detecting soot. An approach which is widely adopted in laboratories is to use scattering of light by the soot particles. This procedure is suitable for complex measuring devices. Implementing an optical sensor in a motor vehicle entails very high costs. Furthermore, there are unresolved problems with respect to the contamination of the required optical windows by combustion exhaust gases.

DE 195 36 705 A1 discloses a device for measuring soot particles, wherein an electrical field is generated between a cover electrode through which the gas stream flows and an internal electrode within this cover electrode by applying a constant electrical direct voltage, and the charging current for maintaining the constant direct voltage between the cover electrode and the internal electrode is measured. Good measurement results are achieved within the scope of the disclosure in DE 195 36 705 A1 if a direct voltage of 2000 to 3000 V is used to generate the electrical field.

With these electrostatic soot sensors, the current between the two electrodes changes as a function of the soot concentration in the exhaust gas stream. However, the currents occurring here are relatively small and their current strength is of the order of magnitude of nA. Therefore, the entire measuring arrangement must be embodied with very high impedance for these electrostatic soot sensors.

When measuring soot particles using electrostatic soot sensors in the exhaust section of a motor vehicle a cold soot sensor, for example at the start of an internal combustion engine which has cooled down, cannot be used for measuring soot, since condensed water from the exhaust gas stream accumulates on and in the soot sensor and initially makes it unstable for high-voltage operation, which rules out reliable measurement of soot. There is always a high proportion of water in the gas phase in the exhaust gas of an internal combustion engine, since the hydrocarbons, for example from the diesel fuel, mainly burn to form water and carbon dioxide.

As long as the soot sensor is cold, the water from the exhaust gas condenses to form liquid water on the electrodes and the insulating body and therefore disrupts the measurement of soot over a long period. Therefore, at the start of the measurement of soot it is necessary to wait until the soot sensor has become so warm that water can no longer condense out of the exhaust gas stream and the water which has already condensed out has dried off from the soot sensor. At this time, what is referred to as the dew point release occurs for the soot sensor. Only very imprecise dew point release can take place in connection with a temperature measurement in the exhaust gas stream, since the complete drying of the soot sensor depends on a very large number of factors (for example ambient temperature of the vehicle, air humidity of the intake air, and gas mass flow in the exhaust section).

SUMMARY

The teachings of the present disclosure may enable an electrostatic soot sensor having a voltage supply and a method for operating an electrostatic soot sensor having a voltage supply, with which the readiness of the electrostatic soot sensor for measurement can be determined reliably and precisely. The electrostatic soot sensor should in this case be able to be produced as cost-effectively as possible.

For example, some embodiments include an electrostatic soot sensor (1) having a voltage supply (6). The electrostatic soot sensor (1) has a first electrode (2), a second electrode (3), and a guard electrode (16). The first electrode (2) and the second electrode (3) are electrically insulated from one another by means of an insulating body (5). The guard electrode (16) is arranged between the first electrode (2) and the second electrode (3), wherein the guard electrode (16) is also electrically insulated from the first electrode (2) and the second electrode (3) by the insulating body (5). A first electrical potential (14) is applied to the first electrode (2) with the voltage supply (6), and a second electrical potential (18) is applied to the second electrode (2) with the voltage supply (6).

An electrical voltage is brought about between the first electrode (2) and the second electrode (3), characterized in that a guard potential, which corresponds to a first guard potential (19) in the warm-up phase of the soot sensor (1) and to a second guard potential (20) in the measuring phase of the soot sensor (1), is applied to the guard electrode (16) by means of the voltage supply (6).

In some embodiments, the voltage supply (6) switches the guard potential present at the guard electrode (16) from the first guard potential (19) to the second guard potential (20) when a dew point release is brought about.

In some embodiments, the absolute value of the first guard potential (19) is closer to the absolute value of the relatively high electrical potential which is present at the first electrode (2) or the second electrode (3) than the absolute value of the second guard potential (20).

Some embodiments may include a method for operating an electrostatic soot sensor (1) having a voltage supply (6), wherein the electrostatic soot sensor (1) has a first electrode (2), a second electrode (3) and a guard electrode (16), wherein the first electrode (2) and the second electrode (3) are electrically insulated from one another by an insulating body (5), and the guard electrode (16) is arranged between the first electrode (2) and the second electrode (3), wherein the guard electrode (16) is also electrically insulated from the first electrode (2) and the second electrode (3) by the insulating body (5), wherein a first electrical potential (14) is applied to the first electrode (2) by means of the voltage supply (6), and wherein a second electrical potential (18) is applied to the second electrode (2) by means of the voltage supply (6), such that an electrical voltage arises between the first electrode (2) and the second electrode (3), characterized in that a guard potential is applied to the guard electrode (16) by means of the voltage supply (6), which guard potential corresponds to a first guard potential (19) in the warm-up phase of the soot sensor (1) and corresponds to a second guard potential (20) in the measuring phase of the soot sensor (1).

In some embodiments, the voltage supply (6) switches the guard potential which is present at the guard electrode (16) from the first guard potential (19) to the second guard potential (20) when a dew point release is brought about.

In some embodiments, the absolute value of the first guard potential (19) is closer to the absolute value of the relatively high electrical potential which is present at the first electrode (2) or at the second electrode (3), than the absolute value of the second guard potential (20).

In some embodiments, a current gradient dI/dt in the dropping branch of the normal curve 25 and/or of the fault curve 26 is evaluated, and on the basis of this current gradient it is possible to differentiate between a faultless and a faulty soot sensor.

In some embodiments, a current gradient dI/dt in the dropping branch of the normal curve 25 and/or of the fault curve 26 is evaluated, and on the basis of this current gradient it is possible to differentiate between a faultless and a faulty soot sensor.

BRIEF DESCRIPTION OF THE DRAWINGS

In the text which follows, the teachings of the present disclosure will be explained with reference to the appended drawings and on the basis of example embodiments. These embodiments comprise soot sensors for use in a motor vehicle. In the drawings.

DETAILED DESCRIPTION

A guard potential which corresponds to a first guard potential in the warm-up phase of the soot sensor and to a second guard potential in the measuring phase of the soot sensor is applied to the guard electrode by means of the voltage supply. Therefore, in the warming up phase the entire leakage current can be conducted from the first electrode to the second electrode. As a result, it becomes possible to carry out the leakage current measurement with the same current-measuring element which is also used to determine, during the measuring phase, the flow of current which is caused by the soot.

When the soot sensor is ready to measure, e.g., the dew point release is reached, the measuring phase in which the second guard potential ensures that all the leakage currents which are possibly still flowing are being diverted from the guard electrode and are not flowing between the first electrode and the second electrode can begin. Therefore, in the measuring phase, exclusively the flow of current which is caused by the soot, between the first electrode and the second electrode, is measured by the current element. This ensures a high level of accuracy of the measurement results of the soot sensor. With just a single current-measuring element it is possible to determine both the leakage current during the warming-up phase and the flow of measuring current which is caused by the soot. Since just a single current-measuring element is used, the electrostatic soot sensor can be manufactured cost-effectively.

In some embodiments, the voltage supply switches the guard potential present at the guard electrode from the first guard potential to the second guard potential when a dew point release is brought about. As a result, the measurement of the current before and after the dew point release can be carried out with just a single current-measuring element, which considerably reduces the manufacturing costs for the soot sensor.

In some embodiments, the absolute value of the first guard potential is closer to the absolute value of the relatively high electrical potential which is present at the first electrode or the second electrode than the absolute value of the second guard potential. Therefore, the guard electrode can conduct virtually the entire leakage current to the second electrode.

Figure 1:
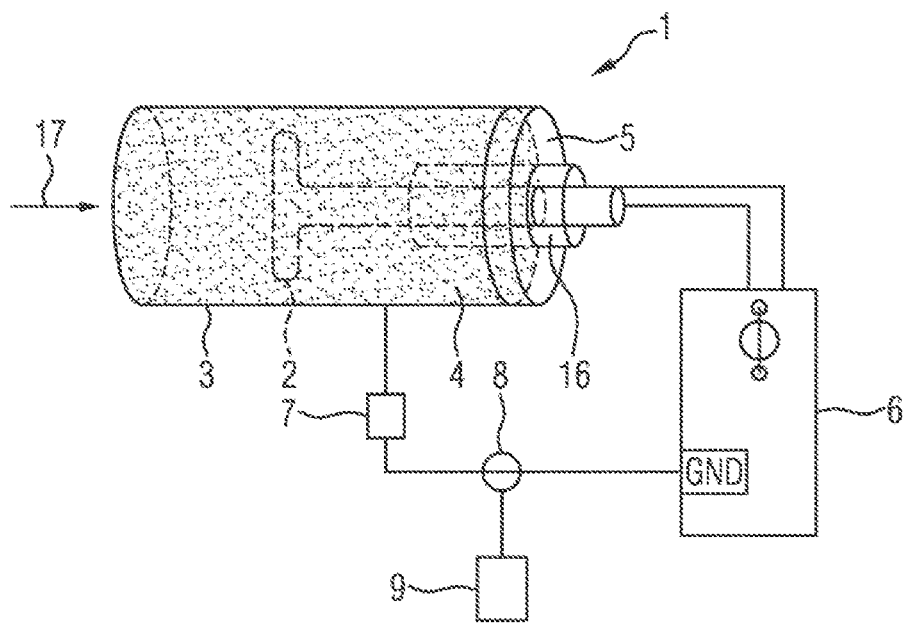
FIG. 1 shows a soot sensor, according to teachings of the present disclosure.

FIG. 1 shows a soot sensor 1. The soot sensor 1 comprises a first electrode 2 which is arranged in the interior of a second electrode 3. The exhaust gas 17 of the internal combustion engine in which soot particles 4 are contained is located between the first electrode 2 and the second electrode 3. The concentration of the soot particles 4 in the exhaust gas 17 is to be measured by means of the soot sensor 1. In other words, the soot content in the exhaust gas stream 17 is to be determined by means of the soot sensor 1.

For this purpose, a measuring voltage is applied between the first electrode 2 and the second electrode 3 by means of the voltage supply 6. This voltage results from a first electrical potential which is applied to the first electrode 2 and a second electrical potential which is applied to the second electrode 3. The first electrode 2 is electrically insulated from the second electrode 3 using the insulating body 5. The insulating body 5 may comprise a disk made of a ceramic material.

In some embodiments, a guard electrode 16 is arranged in the soot sensor 1. The guard electrode 16 may be used primarily to stabilise the voltage conditions and electrical potentials in the soot sensor 1, and ensure that no leakage currents flow between the first electrode 2 and the second electrode 3 during the measuring operation of the soot sensor 1. Leakage currents are undesired currents which flow through the insulating body 5 during the measuring operation of the soot sensor 1 as a result of insufficient insulation properties, and therefore falsify the measurement results of the soot sensor 1 significantly.

During the soot-measuring operation, the potential of the guard electrode 16 is set somewhat above the potential of the second electrode 3. As a result, possibly present leakage currents flow to the guard electrode 16 and are diverted there, without influencing the measurement of the current of the soot sensor 1. In a typical measuring configuration, the second electrode 3 is at ground potential GND, that is to say at 0 V, the guard electric 16 is a somewhat increased potential, for example at 0.5 V, and the first electrode is a very high potential, for example 1000 V.

Furthermore, it is apparent in FIG. 1 that an ohmic resistor 7, which is embodied with high impedance to measure the relatively small currents which can be formed owing to the soot particles 4 between the first electrode 2 and the second electrode 3, is connected between the voltage supply and the second electrode 3. The measuring of these currents is carried out by the current-measuring element 8 which is connected to evaluation electronics 9. Such soot sensors 1 are used for on-board diagnostics in motor vehicles with diesel engines. The voltage which is applied between the first electrode 2 and the second electrode 3 is relatively high, in order to obtain usable measuring currents. Such a voltage may be between 100 V and 3 kV and is, therefore, relatively laborious to control.

In some embodiments, accumulations of water on the first electrode 2 and the second electrode 3, as well as on the insulating body 5, can bring about complete falsification of the soot measurement. Therefore, the soot sensor 1 must be completely dried before the start of the soot measurement, which is signalled by what is referred to as the dew point release.

Figure 2:
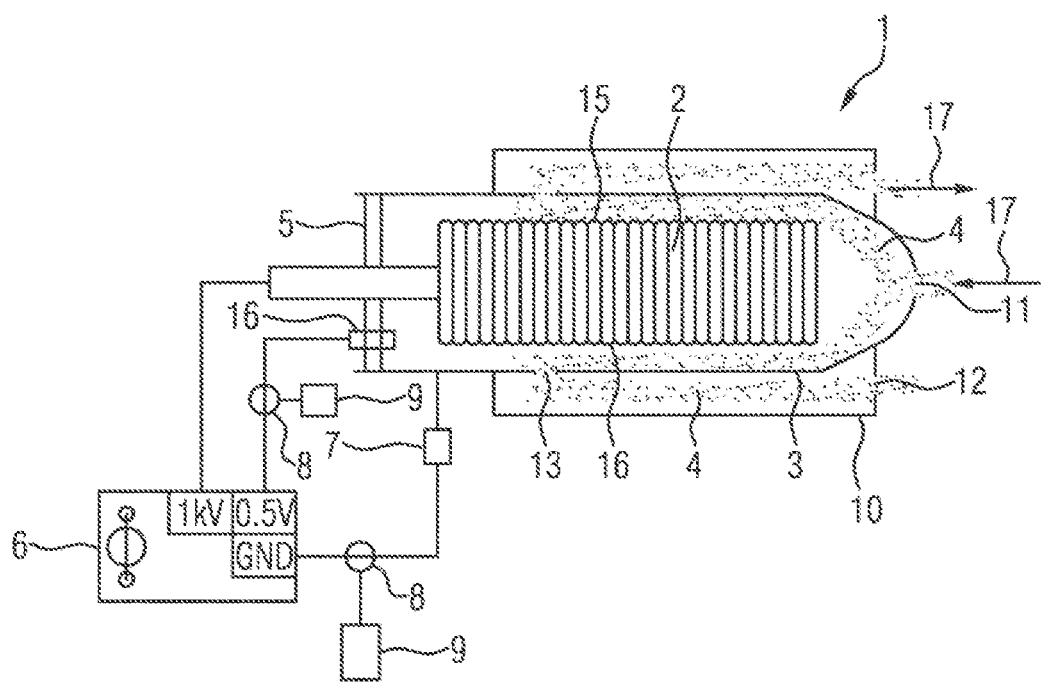
FIG. 2 shows a further soot sensor, according to teachings of the present disclosure.

FIG. 2 shows a soot sensor 1 with a first electrode 2 and a second electrode 3. The first electrode 2 is electrically insulated from the second electrode 3 by an insulating body 5, and an electrical voltage of 1 kV, generated by the electrical voltage supply 6, is applied between the first electrode 2 and the second electrode 3.

Soot particles 4 which are transported through an exhaust pipe in an exhaust gas stream of an internal combustion engine can penetrate the soot sensor 1 which is integrated into the exhaust section. The soot particles 4 enter an electrical field which is formed between the first electrode 2 and the second electrode 3 owing to the applied electrical voltage. To generate an electrical current which can be measured well between the first electrode 2 and the second electrode 3, elements 15 for concentrating the electrical field strength can be formed on the surface of the first electrode 2 and/or on the surface of the second electrode 3.

In this example, the first electrode 2 is embodied as a bar-shaped threaded rod, wherein the elements 15 are designed to concentrate electrical field strength through the threads, between which triangular peaks are formed. The electrical field is concentrated at these peaks, as a result of which the electrical field strength in the region of the peaks becomes very high. The pronounced increase in the electrical field strength in the region of the peaks can exceed the breakdown field strength of the gas in the region. When the breakdown field strength of the gas is exceeded, electrically charged particles are formed which are accelerated in the direction of the opposite electrode and, owing to impact ionizations, give rise to an avalanche-like formation of charge carriers.

If this charge carrier avalanche reaches an electrode surface, very high current can be measured which can be evaluated well and which is proportional to the number of the charged particles in the exhaust gas. However, FIG. 2 also shows an ohmic resistor 7, which may allow the evaluation electronics 9 to measure the electrical current which flows between the first electrode 2 and the second electrode 3. Moreover, FIG. 2 shows a protective cap 10 which serves to guide the exhaust gas stream 17 through the soot sensor 1 in a targeted fashion. The exhaust gases can, for example, penetrate the soot sensor 1 through a first opening 11, where the soot content in the exhaust gas can be measured between the first electrode 2 and the second electrode 3. After this, the exhaust gas stream 17 exits the soot sensor 1 through the second opening 12 which is formed in the second electrode 3 and is fed back into the main exhaust gas stream via the third opening 13.

A guard electrode 16 can be seen in the insulating body 5. The guard electrode 16 can be used to measure, before the time of the dew point release, a current which serves as an indicator for a dew point release of the soot sensor 1. The current is driven via the moist insulating body to the guard electrode 16 by the voltage at the first electrode 2 (in this example 1 kV), said guard electrode 16 being biased in this example with 0.5 V somewhat towards the ground potential GND at the second electrode 3. Complete drying of the soot sensor 1 can be inferred only when this current drops clearly, this is so by at least one power of ten, after the start of the cold internal combustion engine and a dew point release can take place. However, with this type of dew point release at least two current measuring elements 8, specifically one in the line between the guard electrode 16 and the voltage supply 6 and one in the line between the first or second electrode 2, 3 and the voltage supply 6, are necessary in order to operate the soot sensor 1. The number of necessary current-measuring elements 8 increases the cost of the soot sensor 1. However, it is any case advantageous to keep the manufacturing costs for the soot sensor 1 as low as possible.

However, it is also conceivable to use a current measurement between the first electrode 2 and the second electrode 3, that is to say between 1 kV and the ground potential GND, in order to determine the time of the dew point release. The dropping of the current by at least one power of ten is also evaluated here as a sign of complete drying of the soot sensor after the start of the cold internal combustion engine.

Figure 3:
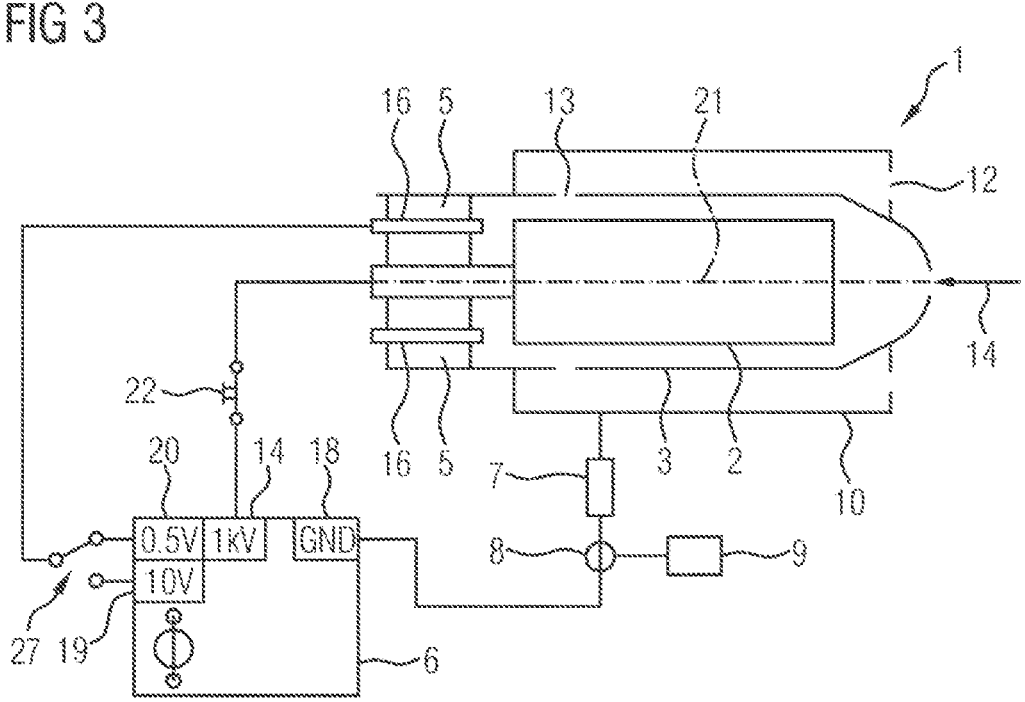
FIG. 3 shows a soot sensor, according to teachings of the present disclosure.

FIG. 3 shows a soot sensor 1 with a voltage supply 6. The soot sensor 1 has a first electrode 2 and a second electrode 3. The soot particles can penetrate the interior of the soot sensor with the exhaust gas stream 17 through a first opening 11 which is formed in the protective cap 10. In this context, the soot particles enter the intermediate space between the first electrode and the second electrode 3. Furthermore, the soot sensor 1 according to the invention has a voltage supply 6 which can apply two different potentials to the guard electrode 16 using a switching element 27. The guard potential which is applied to the guard electrode 16 by the voltage supply 6 corresponds to a first guard potential in the warm-up phase of the soot sensor 1 and to a second guard potential in the measuring phase of the soot sensor 1. The first guard potential can be, for example, 10 V to GND and the second guard potential can be, for example, 0.5 V to GND.

As long as the exhaust gas sensor 1 is cold, which will be the case e.g. after the new start of the internal combustion engine, water molecules present in the gas stream 17 are deposited as condensate in the entire soot sensor 1. This water condensate settles inter alia on the insulating body 5, wherein an electrically conductive connection is produced between the first electrode 2, the guard electrode 16 and the second electrode 3. By means of the voltage supply 6 it is possible to apply a high voltage of e.g. 1000 V to the first electrode 2. The second electrode 3 is preferably kept at ground potential GND. The guard electrode 16 is placed at a raised potential (first guard potential) with respect to its potential (second guard potential) during the soot-measuring operation. The potential of the guard electrode 16 during the soot-measuring operation can be, for example, 0.5 volt, and the increased potential of the guard electrode 16 can be 10 V. In order to switch between the potential of the guard electrode 16 during the soot-measuring operation and the raised potential of the guard electrode 16 the voltage supply 6 has a switching element 27 which is embodied, for example, as an electronic circuit. Owing to the condensate which has formed on the surface of the insulating body 5, a high current begins to flow across the insulating body 5. This current, which flows between the first electrode 2 and second electrode 3 via the guard electrode 16 owing to the condensate on the insulating body is at least a potential of ten higher than the measuring current which flows when the entire soot sensor 1 is completely dried. The leakage current which flows across the insulating body 5 owing to the aqueous condensate makes measurement of soot with the wetted soot sensor impossible. Nevertheless, this current can be observed in order to detect the dew point release of the soot sensor 1 and check the functional capability of the soot sensor 1. As a result of the raised potential of the guard electrode 16, only very little leakage current can flow away via the guard electrode 16. The drying process of the soot sensor can therefore be observed very well with the single current-measuring element 8 in the GND line. If the soot sensor 1 has then heated up owing to the hot exhaust gas 17 to such an extent that the entire aqueous condensate has been removed from the interior of the soot sensor 1, the dew point release can take place and the measuring phase of the soot sensor can begin. In order to measure the current, the system which is illustrated in FIG. 3 has just a single current-measuring element which is connected to the evaluation electronics 9. These evaluation electronics 9 can record and evaluate the sensor currents illustrated in FIG. 6.

After the dew point release, the measuring phase of the soot sensor 1 can begin. For this purpose, the second guard potential 20 is applied to the guard electrode 16 using the switching element 27. Since the second guard potential 20 at, for example, 0.5 V differs from the GND potential (0 V) of the second electrode 3 only to a very small extent, the remaining leakage currents are derived virtually completely from the guard electrode 16, as a result of which the measuring results of the soot sensor 1 are not falsified by the leakage currents.

In this example, the guard electrode 16 is integrated into the ceramic insulating body 5 of the soot sensor 1. However, the insulating body 5 does not necessarily have to be composed of a ceramic. It is also conceivable to use e.g. a heat-resistant plastic or other insulating materials such as e.g. materials composed of the element carbon in a corresponding crystal lattice structure which gives rise to a high degree of insulation.

Figure 4:
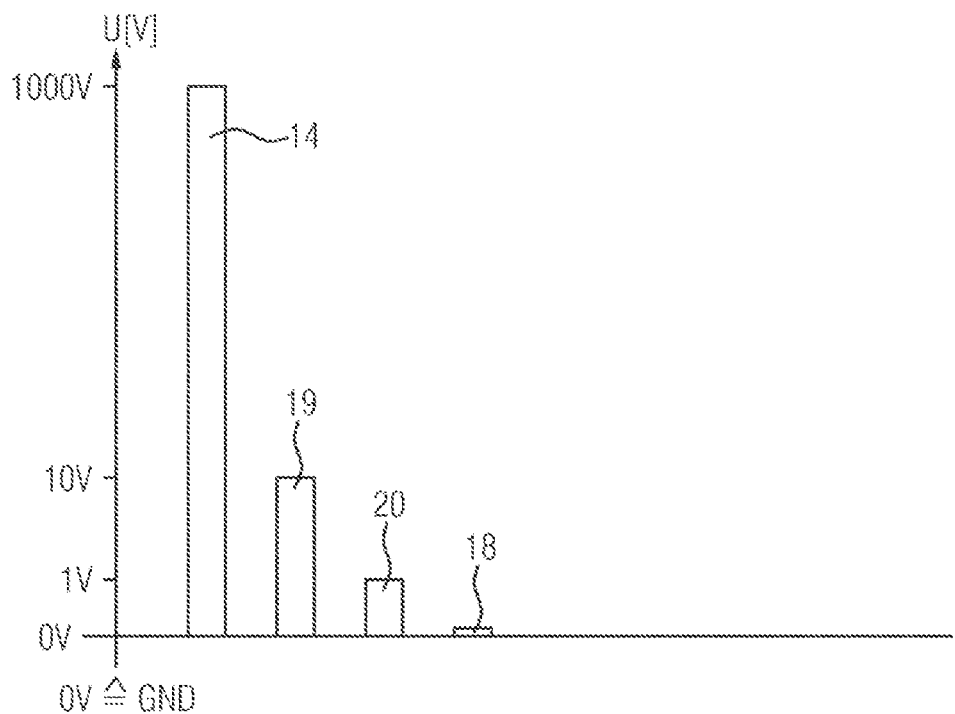
FIG. 4 shows, by way of example, the different electrical potentials, according to teachings of the present disclosure.

FIG. 4 shows by way of example the different electrical potentials which can be present at the individual electrodes. The first potential 14, which is illustrated here by way of example as 1000 V to GND, can be present at the first electrode 2. This first potential can, however, also be between 500 V and 3000 V. For example a potential of 0 V, that is to say the ground potential GND, is present at the second electrode 3 here. The potentials can change between the first and second electrodes, all that is important is that a high voltage is brought about at the first electrode 2 and the second electrode 3. The potential at the guard electrode 16 can assume two values, and this is ensured by the voltage supply 6 in conjunction with the switching element 27. The absolute value of the first guard potential 19 is closer to the absolute value of the relatively high electrical potential, which in this example is present at the first electrode 2, than the absolute value of the second guard potential 20. The first guard potential 19 is here, for example, 10 V to GND, and the second guard potential 20 is here, for example, 1 V to GND. The first guard potential 19 can assume values between 5 V and 200 V to GND, and the second guard potential 20 can assume values between 0.2 V and 10 V to GND.

Figure 5:
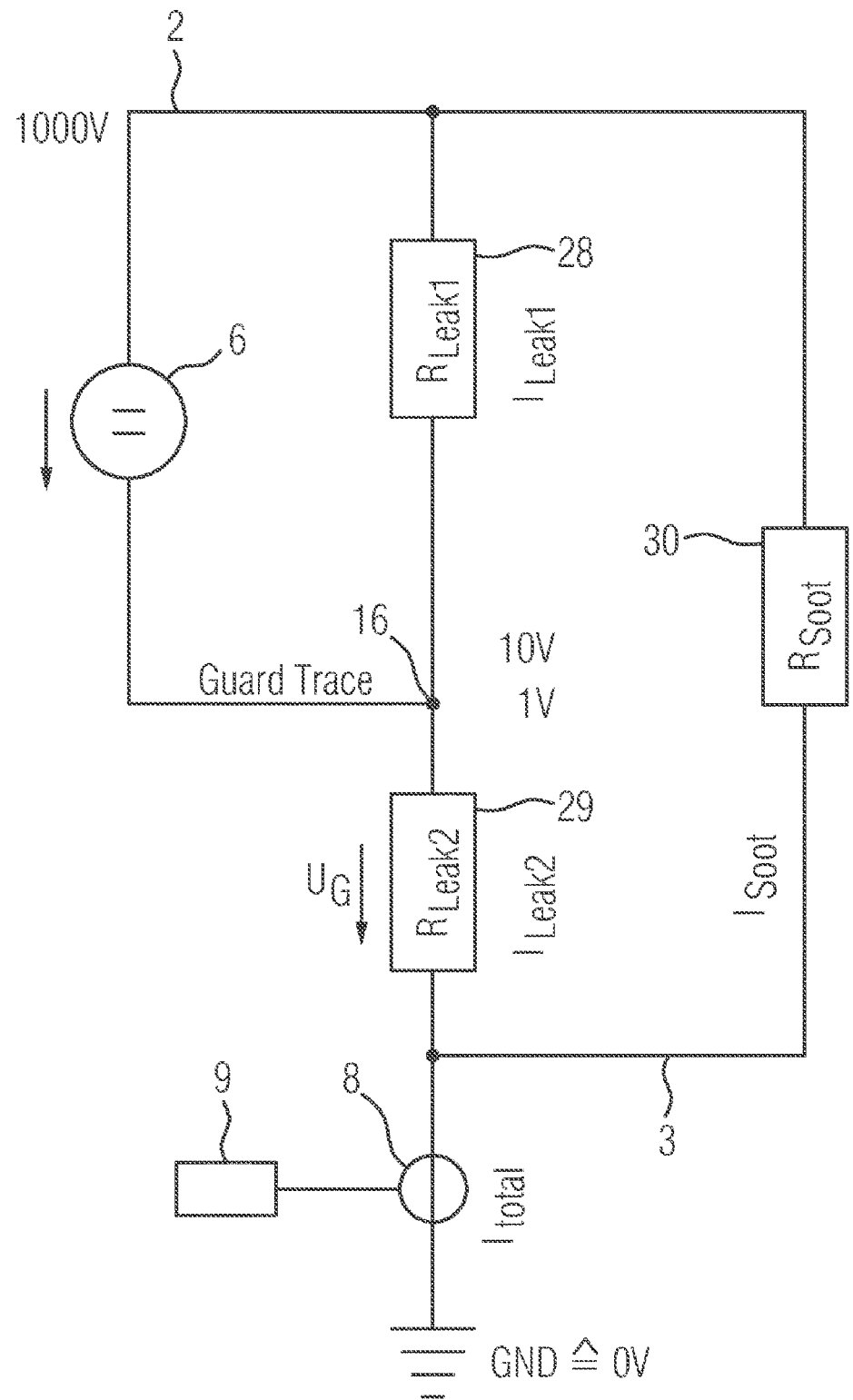
FIG. 5 shows an equivalent circuit diagram of the electrostatic soot sensor, according to teachings of the present disclosure.

FIG. 5 shows an equivalent circuit diagram of the electrostatic soot sensor 1 having a voltage supply 6. The voltage supply 6 applies a maximum voltage of 1000 V to the first electrode and the ground potential GND to the second electrode. The guard electrode 16 is supplied selectively with the first guard potential (10 V) or the second guard potential (1 V). In the measuring phase of the soot sensor 1, the current Isoot flows via the third equivalent resistor 30 and can be measured by the single current-measuring element 8, and this measurement result can be further processed by the evaluation electronics 9. The leakage current Ileak1 is taken up almost completely by the guard electrode 16, as the latter is connected to the second guard potential of 1 V.

Before the dew point release, the guard electrode 16 is connected to the first guard potential of 10 V as a result of which the entire leakage current, that is to say Ileak2, is conducted to the second electrode. On the way to the ground potential GND of the second electrode, the entire leakage current Ileak2 is measured by the single current-measuring element 8, and this measurement result can in turn be evaluated and further processed by the evaluation electronics 9.

Figure 6:
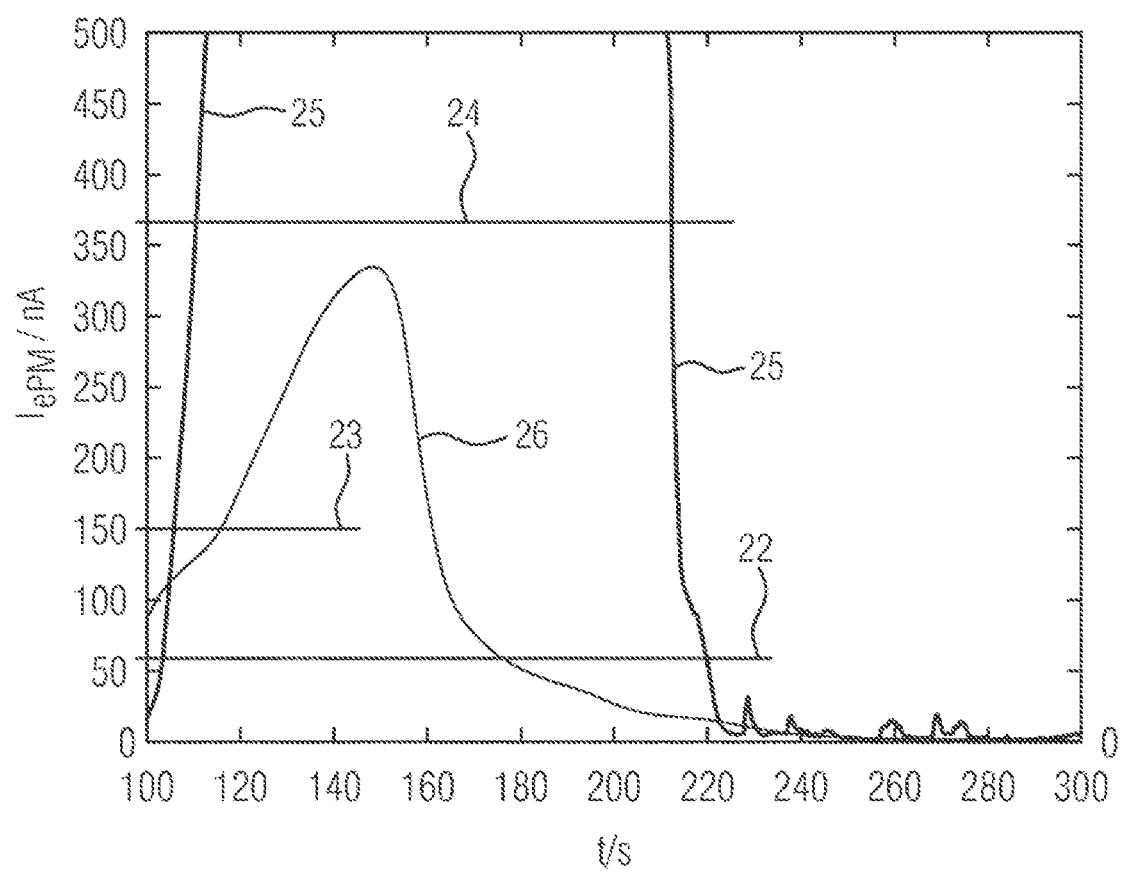
FIG. 6 shows a current-time curve which has been produced by a soot sensor, according to teachings of the present disclosure.

FIG. 6 shows two current-time curves which have been recorded with the electrostatic soot sensor 1. Both current-time curves have been recorded with a first guard potential (for example 10 V) at the guard electrode 16 and represent the situation of the warm-up phase of the soot sensor 1 before the dew point release. The normal curve 25 shows a strong rise in the current after the start of the internal combustion engine because condensate is precipitated in the soot sensor 1 and permits a very high leakage current across the insulating body. As the normal curve 25 rises, it breaks through a first threshold 22, a second threshold 23 and a third threshold 24, before then leaving the measuring range of the current-measuring element after approximately 110 s. The drying phase of the soot sensor 1 lasts approximately 220 s, and then the first threshold 22 undershoots the normal curve, and the dew point release can take place, after which the guard electrode is connected to the second guard potential (for example 0.5 V) and the measuring phase of the soot sensor 1 can begin.

In order to perform fault diagnostics, the current gradient dI/dt in the dropping branch of the normal curve 25 and/or the fault curve 26 can be evaluated. On the basis of this current gradient it is possible to differentiate between a faultless and a faulty soot sensor.

The fault curve 26 was also recorded with a first guard potential (for example 10 V) at the guard electrode 16, and therefore also represents the situation of the warm-up phase of the soot sensor 1 before the dew point release. However, the current-time profile of the fault curve 26 shows a completely atypical behavior. Although the measured current exceeds a second threshold 23 after approximately 110 s, it does not reach the third threshold 24, before dropping below the first threshold 22 after approximately 170 s. This completely atypical current profile in the warm-up phase identifies a faulty soot sensor 1. A fault message can be transmitted to the on-board diagnostic unit of the motor vehicle, and the vehicle driver can be requested to look for a workshop in order to have the defective soot sensor 1 renewed.

What is claimed is:

1. An electrostatic soot sensor comprising:
    a voltage supply;
    a first electrode;
    a second electrode;
    a guard electrode; and
    an insulating body isolating the first electrode and the second electrode from one another;
    wherein the guard electrode is arranged between the first electrode and the second electrode and the guard electrode is electrically insulated from the first electrode and the second electrode by the insulating body;
    wherein a first electrical potential is applied to the first electrode by the voltage supply and a second electrical potential is applied to the second electrode by the voltage supply, with a resulting electrical voltage between the first electrode and the second electrode; and
    a guard potential is applied to the guard electrode by the voltage supply, wherein the guard potential corresponds to a first guard potential in the warm-up phase of the soot sensor and to a second guard potential in the measuring phase of the soot sensor.

2. The electrostatic soot sensor as claimed in claim 1, wherein the voltage supply switches the guard potential present at the guard electrode from the first guard potential to the second guard potential when a dew point release is reached.

3. The electrostatic soot sensor as claimed in claim 1, wherein an absolute value of the first guard potential is closer to an absolute value of an electrical potential present at the higher of the first electrode or the second electrode than the absolute value of the second guard potential.

4. A method for operating an electrostatic soot sensor having a voltage supply, a first electrode, a second electrode, and a guard electrode, the method comprising:
    applying a first electrical potential to the first electrode with the voltage supply;
    applying a second electrical potential to the second electrode with the voltage supply;
    wherein an electrical voltage arises between the first electrode and the second electrode; and
    applying a guard potential to the guard electrode with the voltage supply;
    wherein the guard potential corresponds to a first guard potential in the warm-up phase of the soot sensor and corresponds to a second guard potential in the measuring phase of the soot sensor.

5. The method for operating an electrostatic soot sensor as claimed in claim 4, further comprising switching the guard potential from the first guard potential to the second guard potential when a dew point release is reached.

6. The method for operating an electrostatic soot sensor as claimed in claim 4, wherein an absolute value of the first guard potential is closer to a higher of two absolute values of the electrical potential at the first electrode or at the second electrode than the absolute value of the second guard potential.

7. The electrostatic soot sensor as claimed in claim 1, further comprising a processor programmed to evaluate a current gradient in a dropping branch of a normal curve or of a fault curve, and on the basis of the current gradient differentiates between a faultless and a faulty soot sensor.

8. The method for operating an electrostatic soot sensor as claimed in claim 4, further comprising evaluating a current gradient in a dropping branch of a normal curve or of a fault curve; and
    based on the current gradient, differentiating between a faultless and a faulty soot sensor.

9. The method for operating an electrostatic soot sensor as claimed in claim 4, wherein the first electrode and the second electrode are electrically insulated from one another by an insulating body;
    the guard electrode is arranged between the first electrode and the second electrode; and
    the guard electrode is electrically insulated from the first electrode and the second electrode by the insulating body.

* * * * *